United States Patent Office 2,785,259
Patented Mar. 12, 1957

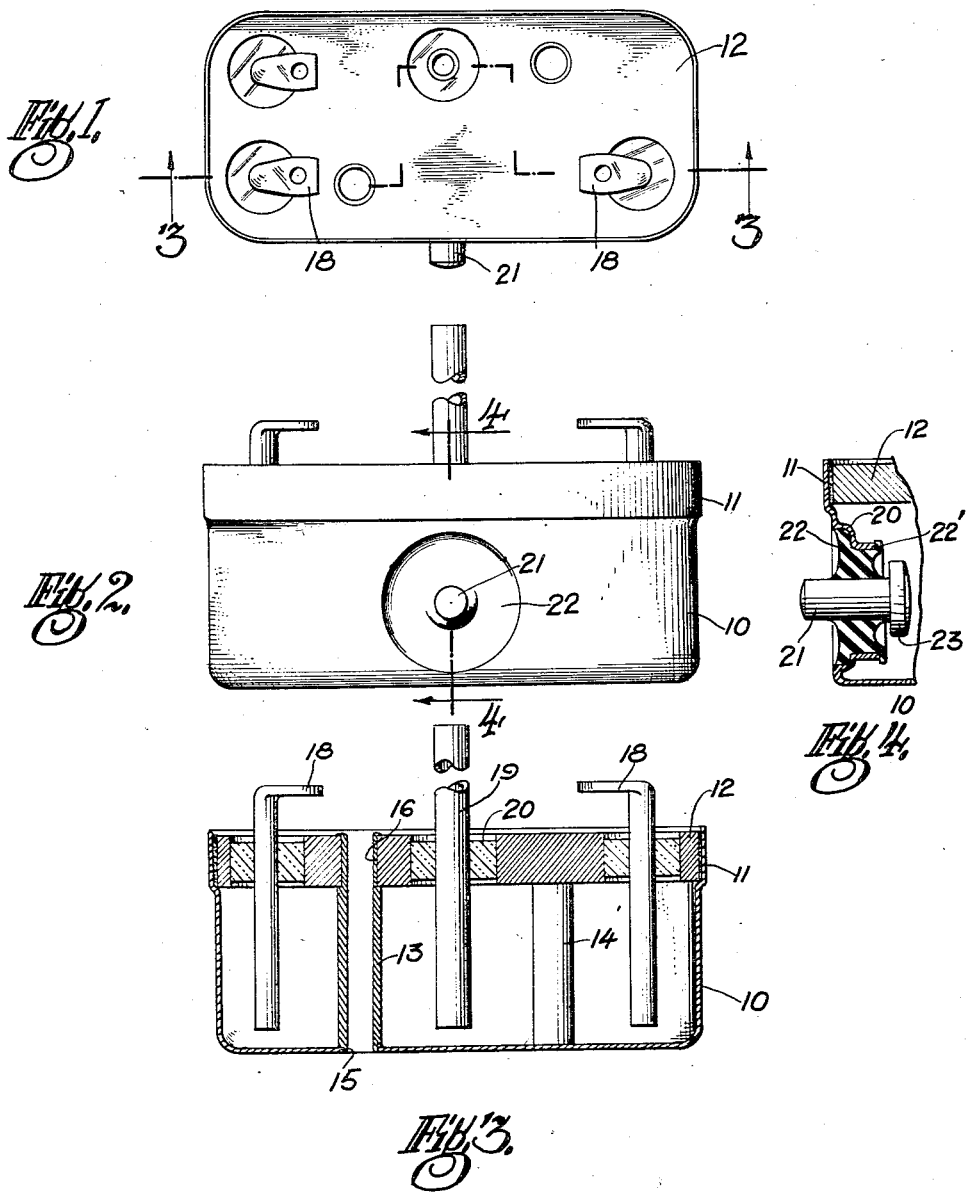

2,785,259

SWITCH CASING

John E. Haydon, Edmonston, Md., assignor, by mesne assignments, to Haydon Switch, Incorporated, Waterbury, Conn., a corporation of Connecticut Application June 18, 1953, Serial No. 362,504

5 Claims. (Cl. 200—168)

This invention relates to an improvement in the casing for a hermetically sealed electric switch, particularly such a switch of the snap action variety. More especially the invention is concerned with the means supported by the casing for actuation of an electric switch hermetically sealed therein and with the manner of support thereof.

The problem involved in actuating a hermetically sealed switch from the exterior of the casing in which it is sealed is of course to transmit the actuating force through a wall of the casing. Obviously this must be done without at the same time permitting leakage to or from the interior of the casing. A straight line actuating movement is preferable, though not essential.

The principal object of my invention is therefore to provide means for actuating an electric switch hermetically sealed within a casing by an actuating force, the origin of which is exterior of the casing, without impairing the sealed condition of the casing. Particularly where snap action switches are involved, this means must of course permit the return of the switch to its normal condition after each actuation thereof.

Hence my invention broadly contemplates the provision of an opening in one wall of the casing enclosing a switch, a switch-actuating member extending through the opening, and a flexible support member positioned within the opening and sealed to the wall thereof and to the actuating member to prevent the passage of any fluid between the support member and either the wall of the opening or the actuating member. Preferably the flexible support member is made of a silicone rubber compound which may be secured to both the wall of the casing opening and to the actuating member in fluid tight seals, and furthermore possesses the characteristics necessary for the conditions of use of the switch contemplated which will be more fully set forth hereinafter.

For a more detailed understanding of my invention, reference may be had to the accompanying drawings illustrating one embodiment thereof and in which:

Fig. 1 is a bottom plan view of the casing;

Fig. 2 is the side elevation thereof;

Fig. 3 is a sectional view taken along line 3—3 of Fig. 1; and

Fig. 4 is a partial sectional view taken along line 4—4 of Fig. 2.

As indicated above, my invention is concerned with the provision and mounting of a switch actuating member in one wall of the casing of a hermetically sealed switch. The casing assembly itself and the mounting of various switch terminals therein is fully described in copending application Serial No. 363,107, filed June 22, 1953. This assemblage comprises a rectangular cup-like casing member 10 drawn from a suitable sheet material such as sheet steel. The casing is formed with a peripheral flange 11 surrounding its open side which is adapted to receive in a tight fit a casing closure member 12 fabricated from a heavier steel stock. Closure member 12 is preferably soldered in place with solder being applied completely around the seam between the closure member and flange 11 to provide a fluid tight seal. A pair of tubular switch mounting bolt supports 13 and 14 are secured tightly in place within casing member 10 prior to closure thereof by closure member 12 and each has one end entering an opening 15 (only one shown) in the bottom of casing member 10. These tubular supports 13 and 14 are soldered or brazed in place. Closure member 12 is also provided with openings 16 (only one shown) through which the upper ends of tubular support members 13 and 14 pass when the closure member 12 is fixed in place. The upper ends of the support members 13 and 14 are peened over and soldered or brazed in place to provide fluid tight seals between the bolts and closure member 12. Bolts for mounting the switch casing for use may hence pass through the switch support members 13 and 14. Terminal members 18 comprising small solid rods and switch support and adjustment member 19 comprising a hollow tube are supported in openings through closure member 12 by a rigid glass sealing compound 20, the characteristics of which are more fully set forth in the aforementioned copending application. Suffice it to say here that the seals between the glass sealing compound supports and the closure member and between those supports and the members supported thereby are fluid tight. When the casing is assembled it may be evacuated through adjustment support 19 and filled with a suitable inert gas, after which the outer end of this member is sealed as by pinching off and soldering.

A particular type of switch with which the above-described casing assembly is particularly useful is that disclosed in the aforementioned copending application.

The portion of the assemblage with which this invention is particularly concerned is illustrated most clearly in Fig. 4. In that figure it will be noted that an opening is formed in one side wall of casing 10, the opening being bounded by a stepped flange 20 extending inwardly into the interior of casing member 10. The flange 20 is preferably integral with the side wall of casing member 10. An actuating pin 21 having an enlarged inner end 23 adapted to engage the actuating portion of a switch mounted within the casing is supported within the opening bounded by flange 20 by a flexible support 22 having a portion 22' extending beneath the lower edge of the flange. For the rigorous conditions under which the switch is adapted to be employed, I have found that a silicone rubber compound may be most advantageously employed for the construction of support member 22. Such a compound may be readily bonded to flange 20 and to the peripheral surface of pin 21 in a fluid tight manner. Furthermore it possesses sufficient flexibility to permit the necessary movement of pin 21 for actuation of the switch.

It has been found by test that pressures up to 100 pounds per square inch applied either internally or externally of the casing result in no leakage around or rupture of the silicone rubber pin support member. Furthermore, tests of the support show no changes in the characteristics when immersed for 72 hours in fresh water, salt water, soda water, automotive oil and a variety of aircraft oils all at room temperature. It has been found, however, that chlorinated solvents such as carbon tetrachloride, strong alkali solutions such as Oakite, as well as gasoline and hot (200° F. or better) aircraft oil are injurious to the support if it is subjected to them for any considerable period of time. Brief exposure to the latter materials, however, such as might be encountered as a result of accidental spillage thereof will have no harmful effect on the support member. Temperature tests indicate that, while there is some stiffening of the support member at extremely low temperatures, satisfactory flexibility remains, at least down to temperatures of about −70° F. Permeability tests of the support member show no indication of gas diffusion therethrough, which indicates a long hermetic life under reasonably favorable conditions.

Various changes and modifications may of course be made in the actuating means and support therefor without departing from my invention, the scope of which should therefore be limited only to the extent set forth in the appended claims.

I claim:

1. In a switch casing adapted to be hermetically sealed, one wall of the casing having an opening therethrough, a switch-actuating member extending through said opening, substantial axial movement of said switch-actuating member being required for switch actuation, and a flexible support member positioned within said opening and sealed to the wall thereof and to said actuating member to prevent the passage of any fluid between said support member and said wall and between said support and said actuating member, the outer surface of said flexible support member being substantially planar and lying substantially in the plane of the outer surface of said casing wall whereby no appreciable amount of moisture may accumulate thereon, said flexible support member being so constructed and of such a material that it supports said switch-actuating member for said substantial axial switch actuation movement.

2. A switch casing according to claim 1 in which the flexible support is made of a silicone rubber compound.

3. In a switch casing adapted to be hermetically sealed, one wall of the casing having an opening therethrough, the opening being surrounded by a flange integral with and depending from the casing wall, a flexible support within said opening and sealed to said flange throughout a substantial portion of the length thereof to prevent passage of any fluid therebetween, and an actuating pin supported by said flexible support and passing completely therethrough in a seal-tight relation thereto to prevent passage of any fluid therebetween, the outer surface of said flexible support being substantially planar and lying substantially in the plane of the outer surface of said casing wall whereby no appreciable amount of moisture may accumulate thereon.

4. In a switch casing adapted to be hermetically sealed, one wall of the casing having an opening therethrough, the opening being surrounded by a flange integral with and depending from the casing wall, said flange being provided with a step therein, a flexible support within said opening and sealed to said flange at as well as above and below said step to prevent passage of any fluid therebetween, and an actuating pin supported by said flexible support and passing completely therethrough in a seal-tight relation thereto to prevent passage of any fluid therebetween.

5. A switch casing according to claim 4 in which the flexible support member is made of a silicone rubber compound, in which the flexible support member extends beneath and engages the lower edge of the depending flange, and in which the outer surface of said flexible support is substantially planar and lies substantially in the plane of the outer surface of said casing wall whereby no appreciable amount of moisture may accumulate thereon.

References Cited in the file of this patent

UNITED STATES PATENTS

| | | |
|---|---|---|
| 1,903,135 | Rees | Mar. 28, 1933 |
| 2,334,901 | Bullerjahn | Nov. 23, 1943 |
| 2,383,973 | Jones | Sept. 4, 1945 |
| 2,457,472 | Hufferd et al. | Dec. 28, 1948 |
| 2,532,000 | West | Nov. 28, 1950 |